*US010586522B2*

United States Patent
Judell

(10) Patent No.: US 10,586,522 B2
(45) Date of Patent: *Mar. 10, 2020

(54) ACOUSTIC AND RF CANCELLATION SYSTEMS AND METHODS

(71) Applicant: Foster-Miller, Inc., Waltham, MA (US)

(72) Inventor: Neil Judell, Cambridge, MA (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,352

(22) Filed: Jun. 5, 2018

(65) Prior Publication Data

US 2018/0357997 A1    Dec. 13, 2018

Related U.S. Application Data

(60) Provisional application No. 62/517,376, filed on Jun. 9, 2017.

(51) Int. Cl.
| | | |
|---|---|---|
| G10K 11/178 | (2006.01) | |
| H04B 1/525 | (2015.01) | |
| H04B 11/00 | (2006.01) | |

(52) U.S. Cl.
CPC ....... *G10K 11/17853* (2018.01); *H04B 1/525* (2013.01); *H04B 11/00* (2013.01); *G10K 2210/108* (2013.01); *G10K 2210/3028* (2013.01)

(58) Field of Classification Search
CPC ..... G10K 11/17853; G10K 2210/3028; G10K 2210/108; H04B 1/525; H04B 11/00
See application file for complete search history.

(56) References Cited

U.S. PATENT DOCUMENTS

| | | | |
|---|---|---|---|
| 5,600,073 A | 2/1997 | Hill | |
| 6,789,043 B1 * | 9/2004 | Nelson | ................... G01B 7/004 702/127 |
| 2003/0115232 A1 | 6/2003 | Lipp | |
| 2006/0034447 A1 * | 2/2006 | Alves | .................. G10L 21/0208 379/406.01 |

(Continued)

FOREIGN PATENT DOCUMENTS

WO    WO 2016/205129 A1    12/2016

OTHER PUBLICATIONS

Lopes et al., "The Random Walk Kalman Filter in Multichannel Active Noise Control", IEEE Signal Processing Letters, vol. 22, No. 12, Dec. 2015, pp. 2244-2248.

(Continued)

*Primary Examiner* — Ajay Cattungal
(74) *Attorney, Agent, or Firm* — Iandiorio Teska & Coleman, LLP

(57) ABSTRACT

A method of performing cancellation for acoustic or electromagnetic measurement or communications includes receiving an output signal to be applied to a transmit transducer, introducing a delay to the output signal to produce a delayed output signal, applying the delayed output signal to the transmit transducer, receiving an input signal from a receiving transducer, wherein the input signal comprises at least a portion of the delayed output signal, and iteratively solving a Kalman filter problem as a function of the input signal, the output signal, and the delay to produce a first filtered input signal.

12 Claims, 6 Drawing Sheets

(56) References Cited

U.S. PATENT DOCUMENTS

| | | | | |
|---|---|---|---|---|
| 2006/0093128 A1* | 5/2006 | Oxford | ................. | H04M 9/082 |
| | | | | 379/406.01 |
| 2008/0123770 A1* | 5/2008 | Copeland | .............. | H03F 1/3247 |
| | | | | 375/285 |
| 2008/0129379 A1* | 6/2008 | Copeland | .............. | H03F 1/3241 |
| | | | | 330/149 |
| 2009/0245335 A1* | 10/2009 | Fang | ........................ | H04B 3/30 |
| | | | | 375/222 |
| 2011/0305306 A1* | 12/2011 | Hu | ..................... | H03H 21/0021 |
| | | | | 375/350 |
| 2014/0266431 A1* | 9/2014 | Chen | ..................... | H03F 1/3247 |
| | | | | 330/149 |
| 2014/0269990 A1* | 9/2014 | Chen | ..................... | H04L 27/367 |
| | | | | 375/297 |
| 2015/0078572 A1 | 3/2015 | Milani | | |

OTHER PUBLICATIONS

Written Opinion of the International Searching Authority for PCT Application No. PCT/US2018/036272 dated Aug. 24, 2018, five (5) pages.

\* cited by examiner

ACOUSTIC AND RF CANCELLATION SYSTEMS AND METHODS

RELATED APPLICATIONS

This application claims benefit of and priority to U.S. Provisional Application Ser. No. 62/517,376 filed Jun. 9, 2017, under 35 U.S.C. §§ 119, 120, 363, 365, and 37 C.F.R. § 1.55 and § 1.78, which is incorporated herein by this reference.

FIELD OF THE INVENTION

The inventions herein are applicable to communications, acoustic and radio measurements.

BACKGROUND OF THE INVENTION

One problem in acoustic and radio frequency communication and measurement systems is receiving a low-level received signal in the presence of a high-level outbound transmitted signal. The outbound signal has a direct path from transmit to receive and may also include some indirect paths such as bouncing off walls, the surface of the ocean, etc. The overall rejection of the outbound signal needs to be around 100 dB for communications and 160-200 dB for some measurement systems.

There are a number of possible techniques for solving these problems. These include isolation which allows for some kind of simultaneous transmission and sensing. Physical cancellation cancels the outbound signal using direct acoustics, direct RF, or analog summing at the front of a Low Noise Amplifier (LNA). Digital cancellation cancelling the outbound signal may use purely digital methods (after an A/D converter).

For acoustic systems, one isolation means possible is the use of separate transmission and reception transducers. Many acoustic communication systems today employ a single transducer which operates for both transmission and reception involving a switch to alternately connect transmission power amplifier and reception LNA. Most acoustic measurement systems already employ separate transducers. For full-duplex communication systems, separate transmission and reception transducers may be possible. The amount of isolation in these systems is proportional to the distance between the transducers squared. One meter typically gives 0 dB of isolation—two meters gives 6 dB of isolation. This is generally insufficient to permit full-duplex operation by itself.

RF isolation is provided by either having separate transmission and reception antennas or by employing a device known as a circulator. A circulator is a 3-terminal device which connects to transmitter power amplifier, antenna and receiver LNA. A circulator typically provides about 20 dB isolation between transmitter and receiver while causing loss of about 1 dB on the transmitter-antenna connection and a similar loss on the antenna-LNA connection.

Some radio systems have sufficient isolation between their two antenna elements to permit full-duplex operation. These systems could still benefit from further cancellation to improve range and sensitivity. Circulators rarely provide sufficient isolation to permit full-duplex operation.

In direct acoustic cancellation, an additional transmission transducer is placed on or near the receiving transducer. A cancellation waveform is played through this transducer to directly cancel the outbound signal. See PCT/US2016/037243 (WO2016/205129) (Judell) incorporated herein by this reference.

In direct RF cancellation, an additional antenna may be coupled to the receiving antenna to directly cancel the outbound signal.

In electronic cancellation methods, an electronic signal is generated and electronically summed into the input of the LNA. This method has been studied for Simultaneous Transmit and Receive (STAR). There are several variants.

Stanford University has successfully employed a method specific to RF communication. They construct a number of delay lines of differing length. Each delay line has a variable attenuator attached to it, with the output of all these attenuators going to a summing junction at the LNA. These provide summed, delayed copies of the transmitted signal for cancellation. The technique, as published, suffers two weaknesses.

The first is a theoretical limit of approximately 50 dB of cancellation caused by coarse quantization of the variable attenuators. The second is that the tuning of the attenuators to obtain that level of cancellation requires switching the system to a separate tuning mode from time to time taking the whole communication network down each time. For practical RF systems, this is likely to be a 10% downtime. For acoustic systems with significant range (1 km to 100 km), this is likely to be a 90% downtime. There is, however, an advantage in directly cancelling power amplifier noise and distortion by 50 dB.

University of Texas, Austin employed a D/A and modulator to provide a cancellation signal to the input of the LNA. Their system obtained approximately 20 dB of broadband cancellation. The conventional wisdom for this type of cancellation is that 20 to 40 dB cancellation is the maximum possible broadband cancellation.

The approach explained in PCT/US/2016/037243 (Judell) enhances the Austin approach. This approach is applicable to both acoustic and RF methods, but specific to the case in which we have full control of the transmission loop. It was demonstrated that by including a delay element in the final transmission stage, Austin-type cancellation can reach arbitrary levels. The longer the delay, the greater the possible cancellation. Cancellation of greater than 100 dB has been demonstrated. This (combined with isolation) can be enough to permit full-duplex operation.

But, this approach may have several weaknesses in some systems.

It cannot cancel transmitter power amplifier noise which is not visible to the cancellation circuitry. The method does cancel amplifier distortion up to the accuracy of the amplifier distortion models used in the canceller. This is adequate for many low-power linear amplifier applications like most RF communication and some high-frequency acoustic systems. Ultimately, cancellation is limited by the dynamic range of the cancellation signal generator. While this doesn't limit the cancellation amount, per se, it does limit the maximum transmitter power. The ratio of cancellation signal generator maximum level to cancellation signal generator noise power spectral density must be 3 dB lower than the ratio of outbound signal power to system noise power spectral density.

There are several applications of Kalman filters to active noise cancellation. See for example, IEEE Signal Processing Letters, Vol. 22, No. 12, December, 2015, "The Random Walk Kalman Filter in Multichannel Active Noise Control," Paulo A. C. Lopes, Jose A. B. Gerald and Moisés S. Piedad incorporated herein by this reference.

The are notable differences between the new architecture described herein and that described in Lopez et al. For example, Lopez relates to noise cancellation from unintentional, measured sources. These sources are not under control of the system. Therefore, all of the delay and optimization methods disclosed in PCT/US2016/037243 are not applicable. As a result, the Lopez system must be absolutely real-time and cannot deal with non-minimum-phase cancellation paths. The Lopez system, in relying on very short delays, adapts on every new sample of data. There are no long delays anywhere in their system.

For one preferred application, note the following differences. The interfering signal is under our control, insomuch as we can delay it as much as we like. We tend to have large delays between submission of cancellation signals and their response on the receiver. This characteristic of our types of systems means that we absolutely cannot operate on a sample-to-sample basis—the adaptive means would be attempting to update coefficients based on stale cancellation filters. Because of these constraints our adaptation means be able to skip over chunks of data, so that the adaptive algorithm is working strictly on data from the latest adaptive cycle. Adaptation algorithm is preferably capable of working on contiguous chunks of data, corresponding to buffers of digital down converters and/or delta-sigma A/D converters.

BRIEF SUMMARY OF THE INVENTION

This disclosure deals with convergence and adaptation rates for the Judell method. When a cancellation algorithm provides 100 dB of cancellation this means that the cancellation convergence must be accurate to ten parts per million (10 ppm). This is a very high level of required accuracy. The thermal drift of components can easily exceed this amount in seconds or minutes. An outbound signal bouncing off of waves can vary by many times this amount in the course of a few seconds. We found that the standard methods for adaptation were not optimal. If system operates very fast, then the adaptation would be "fooled" by incoming signals that we want to demodulate and would partially cancel them. In slower systems, they might not be able to keep up with the changing environment of the waves. Tweaking the adaptive rate may be possible but may be difficult to implement.

A method of employing a Kalman filter as the Filtered-X tuning mechanism was found to be ideal. This method allows us to describe the expected rate of change of the environment and the expected signal level for desired received signals. The system then automatically tunes itself at exactly the optimum rate. Several methods for reducing the complexity of the computations required are discussed and disclosed.

Digital cancellation in the Stanford system was required due to the limited analog cancellation. We have found other reasons to employ digital cancellation in the Judell system.

Another feature of the invention is overcoming amplifier distortion. As RF systems scale up in power, amplifier distortion models become less accurate meaning that the Judell system may fail in some instances to adequately cancel the real distortion terms. Many acoustic systems rely on battery power (such as unmanned underwater vehicles (UUVs)). For these systems, power amplifier efficiency is critical. Analog power amplifiers (Class A, B, AB and C) typically have 10% efficiency while digital (Class D) typically have better than 90% efficiency, making Class D a good choice for UUV applications. Unfortunately, Class D amplifier distortion is large (sometimes as much as 10%) and is difficult to model accurately.

We found it necessary to monitor and digitize the Class D amplifier output in an acoustic communication system. This is used in a digital cancellation module. We found that simple digital cancellation using this signal "fought" with the analog cancellation system. As a result, we learned that it was necessary to build a digital cancellation system that simultaneously used the original desired signal, the measured amplifier monitor signal, and the signal applied to the cancellation loop. When all of these are combined, they no longer "fight." Furthermore, it was discovered that the analog cancellation loop made significant errors in estimating the environment due to insufficient modeling of amplifier distortion. This new digital cancellation system corrects those errors.

This has brought us to the realization that the isolation and analog cancellation stages are there in order to ensure that the LNA and A/D sections have sufficient dynamic range to capture the signals with final cancellation applied in the digital stage.

Preferably, this digital cancellation, which applies linear combinations of the time-shifted desired signal, the cancellation signal, and the amplifier signal works perfectly well even if there is no analog cancellation present (i.e. in situations where the front-end has sufficient dynamic range to capture the outbound signal and noise together).

We also note that since we may have control of the amplifier electronics as well, we could monitor the error feedback node of the power amplifier rather than the direct output of the power amplifier. In this fashion, we sample only distortion and noise so the dynamic range of our sampler is not eaten up by the desired signal.

In the event that we do not have access to this error feedback node, then the monitor signal includes the desired transmission signal, plus noise and distortion that we are trying to measure and cancel. The desired transmission signal is generally many times larger than the noise and distortion. To preserve dynamic range on the A/D converter used for monitoring, it is highly desirable to add an analog cancellation loop to remove the desired transmission signal from the monitor signal. This allows the entire A/D dynamic range to be used to monitor noise and distortion.

This invention, in one embodiment, features a method of performing cancellation for acoustic or electromagnetic measurement or communications, including receiving an output signal to be applied to a transmit transducer, introducing a delay to the output signal to produce a delayed output signal, applying the delayed output signal to the transmit transducer, receiving an input signal from a receiving transducer, wherein the input signal comprises at least a portion of the delayed output signal, and iteratively solving a Kalman filter problem as a function of the input signal, the output signal, and the delay to produce a first filtered input signal.

The method may further include iteratively solving a Kalman filter problem as a function of the first filtered input signal, the complex conjugate of the output signal, and the delay to produce a second filtered input signal; and summing the first filtered input signal and the second filtered input signal. The method of performing cancellation may further include iteratively solving a Kalman filter problem as a function of the first filtered input signal, the square or the cube of the output signal, and the delay to produce a third filtered input signal, and summing the first filtered input signal and the third filtered input signal.

The method of performing cancellation in may further include iteratively solving a Kalman filter problem as a function of the first filtered input signal, the delayed output signal, and the delay to produce a fourth filtered input signal, and applying adaptive cancellation to the first filtered input signal as a function of the fourth filtered input signal. The method of performing cancellation may further include iteratively solving a Kalman filter problem as a function of the first filtered input signal and the fourth filtered input signal to produce a fifth filtered input signal. The method may further include amplifying the output signal which generates noise and distortion. The method may further include monitoring the amplified signal. The method wherein the input signal may include at least a portion of the output signal and the noise and distortion. The method may further include cancelling the output signal from the input signal using a cancellation signal. The method may further include digitizing the noise and distortion. The method may further include filtering the input signal as a function of the output signal, the cancellation signal, and the noise and distortion. The method of filtering the input signal may include iteratively solving a Kalman filter problem as a function of the output signal, the cancellation signal, and the noise and distortion.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

The exemplary circuitry of FIGS. 1-6 is described as follows. Signal input 10 is the digital signal for transmission. A blocking filter, which is optional, may include a digital filter that ensures that the signal to be transmitted contains no frequencies outside the ranges allocated for a particular system. The source may already be clean enough to omit this bock. Delay 12 provides for analog cancellation. See PCT/US2016/037243.

The transmitter elements 14 are the digital inputs for the main transmission and cancellation signals. These signals are converted to analog. Depending on frequency of use, there may be analog up-conversion (mixers). The high power output contains the appropriate amplifier and impedance matching to produce an analog output for the transmit transducer. High power typically means more than just carrying signal but this might still only be in the milliWatt region). Appropriate filtering and buffering are provided for the analog cancellation output. The analog amplifier monitor output is brought out of section 14 as shown. The high power output is provided to transmit transducer 16 (e.g., an antenna or acoustic element).

Figure 3:
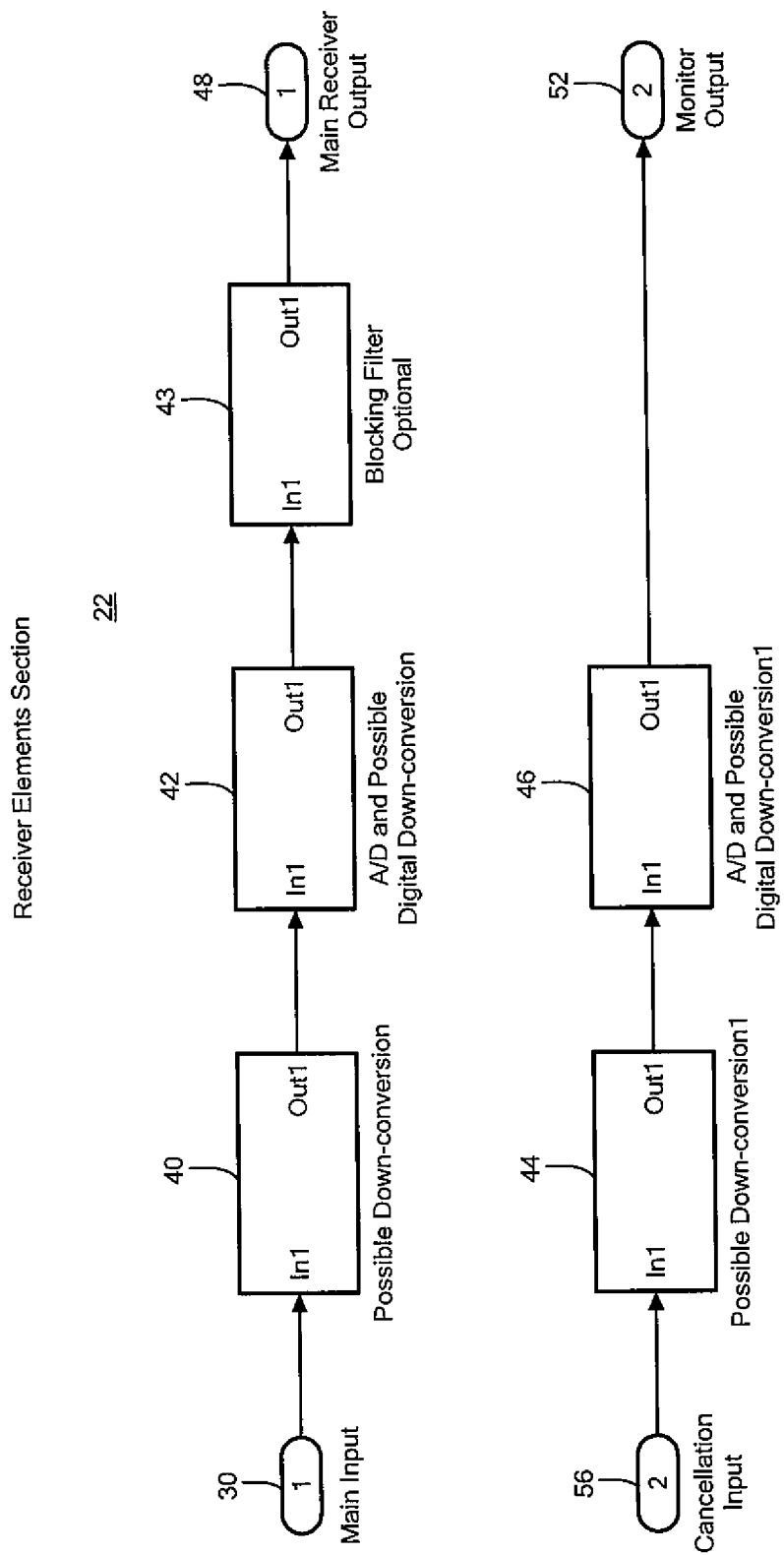
FIG. 3 is a schematic block diagram showing the primary components associated with receiver elements section of FIG. 1.

Receive transducer 18 is also an antenna or acoustic element which provides an output to LNA with summing junction 20 (e.g., a low noise amplifier) which sums together the receiver transducer output and the cancellation output from section 14, producing a level and impedance as needed for the receiver elements. Receiver elements section 22 includes analog inputs for the main input and a monitor input. FIG. 3 shows the contents of FIG. 1, block 22. Depending on frequency, there may be an analog down-conversion performed by mixers 40. A/D conversion and possible digital down-conversion to produce digital versions of these signals are output as shown 42. An optional blocking filter 43 (e.g., a digital filter) blocks all signals from the original transmission spectrum in the event that there is no frequency overlap between transmitted and received signals, so only the frequencies allocated to the received signals are passed. If there is a transmitter monitor circuit, analog down-conversion 44, A/D and possible digital down conversion 46 will usually be present.

Figure 1:
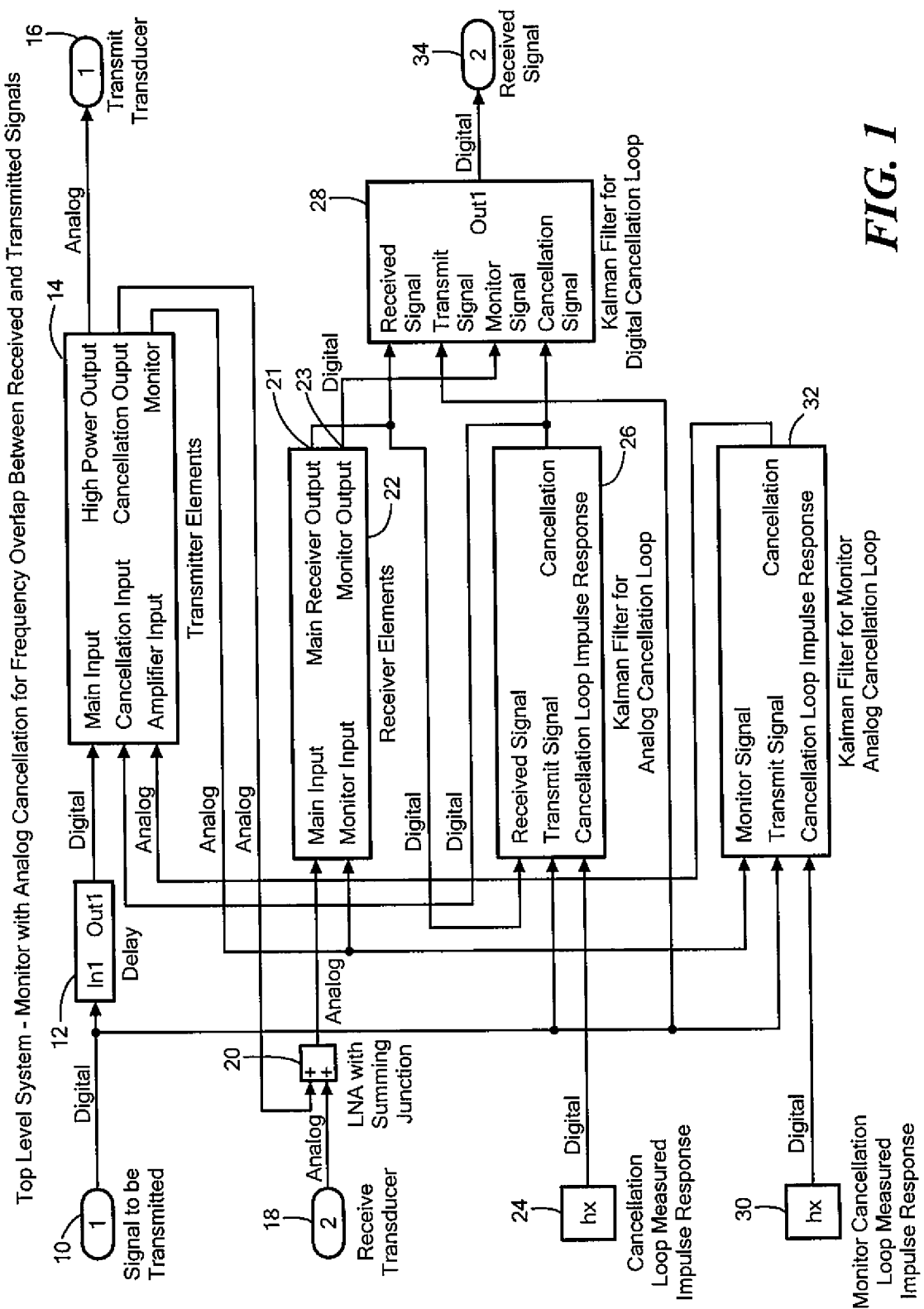
FIG. 1 is a schematic top level block diagram of an example of an acoustic and RF cancellation system.

Cancellation Loop Measured Impulse Response section 24, FIG. 1 is a stored digital transfer function going from output of Kalman Filter for Analog Cancellation Loop section 25 back to the Main Receiver Output 21 of Receiver Elements section 22. This is a calibration for the system, and is used in the Filtered-X cancellation.

The Kalman Filter for Analog Cancellation Loop section 26 is an all-digital algorithm discussed below. The Kalman Filter for Digital Cancellation Loop Section 28 is a digital algorithm taking the output of the Blocking Filter 24 and the Main Receiver Output to produce a best version for output.

The Monitor Cancellation Loop Measured Impulse Response section 30 is a stored digital transfer function going from the output of Kalman Filter for Monitor Analog Cancellation Loop section 32 back to Monitor Output 23 of Receiver Elements section 22. This section provides a calibration for the system and used in the Filtered-X cancellation for the monitor. Note that blocks 30 and 32 may not be needed if there is sufficient dynamic range in the monitor circuit.

The Kalman Filter for Monitor Analog Cancellation Loop section 32 is an all-digital algorithm essentially identical to the Kalman Filter for Analog Cancellation Loop section 26. The Received Signal 34 is a digital signal for processing for communication or measurement.

Figure 2:
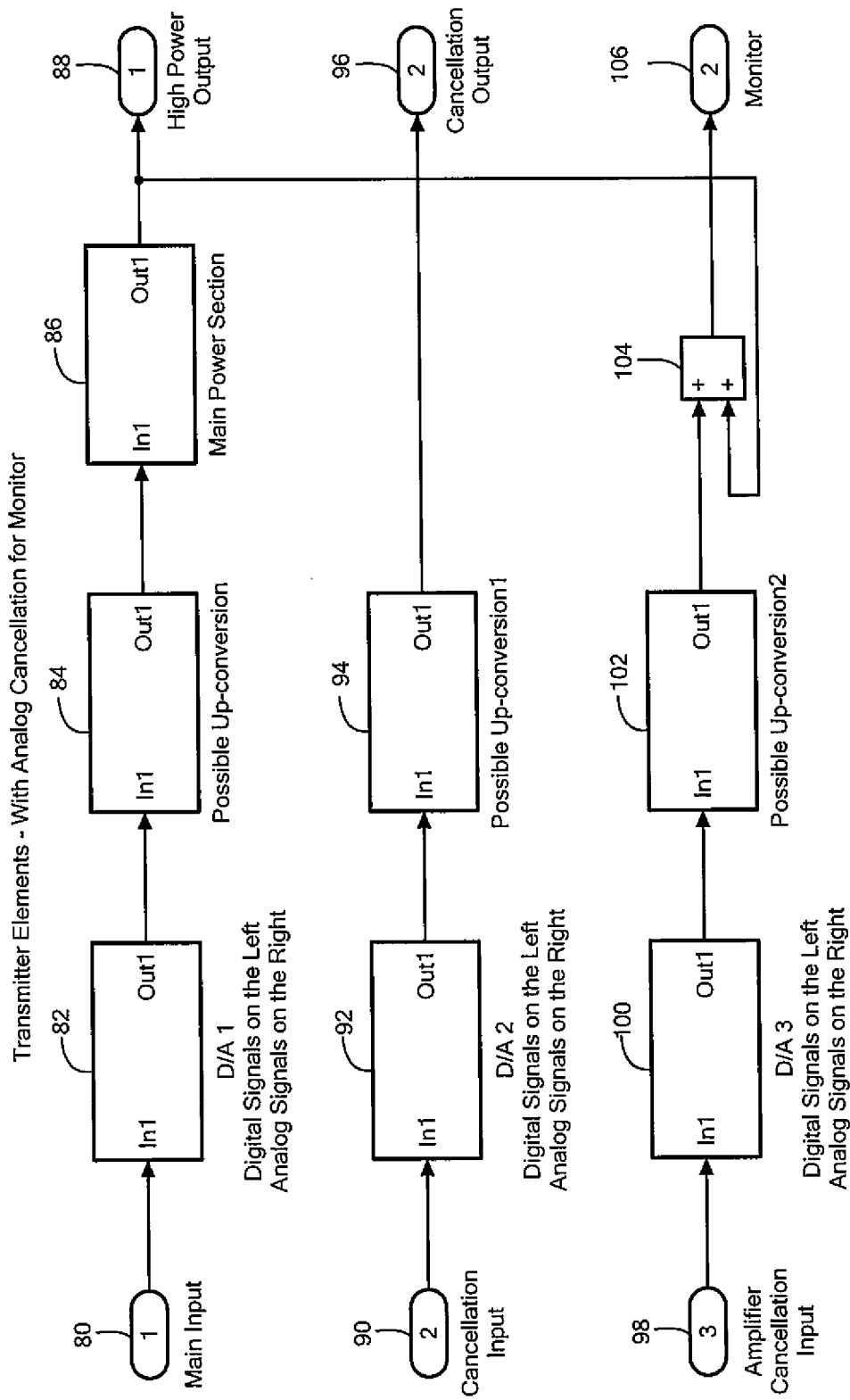
FIG. 2 is a block diagram showing the primary components associated with the transmitter elements section of FIG. 1.

FIG. 2 shows the contents of Transmitter Elements block 14 from FIG. 1. The signal for the main communication output is presented at element 80 as a digital signal. Block 82 converts to an analog signal, optional block 84 upconverts the signal to a higher frequency by analog mixing, if needed. The main power amplifier 86 presents the signal to the high power output terminal 88, as well as to the input to a summing junction 104. The digital receiver cancellation signal input 90 is converted to analog by block 92, and optionally up-converted by mixer 94 to produce analog cancellation output 96. If excess dynamic range for monitor is required, an optional amplifier digital cancellation input is provided at 98, converted to analog at 100, optionally up-converted at 102, and presented to the second input of summing junction 104. The output of the summing junction is output to the monitor 106.

Figure 4:
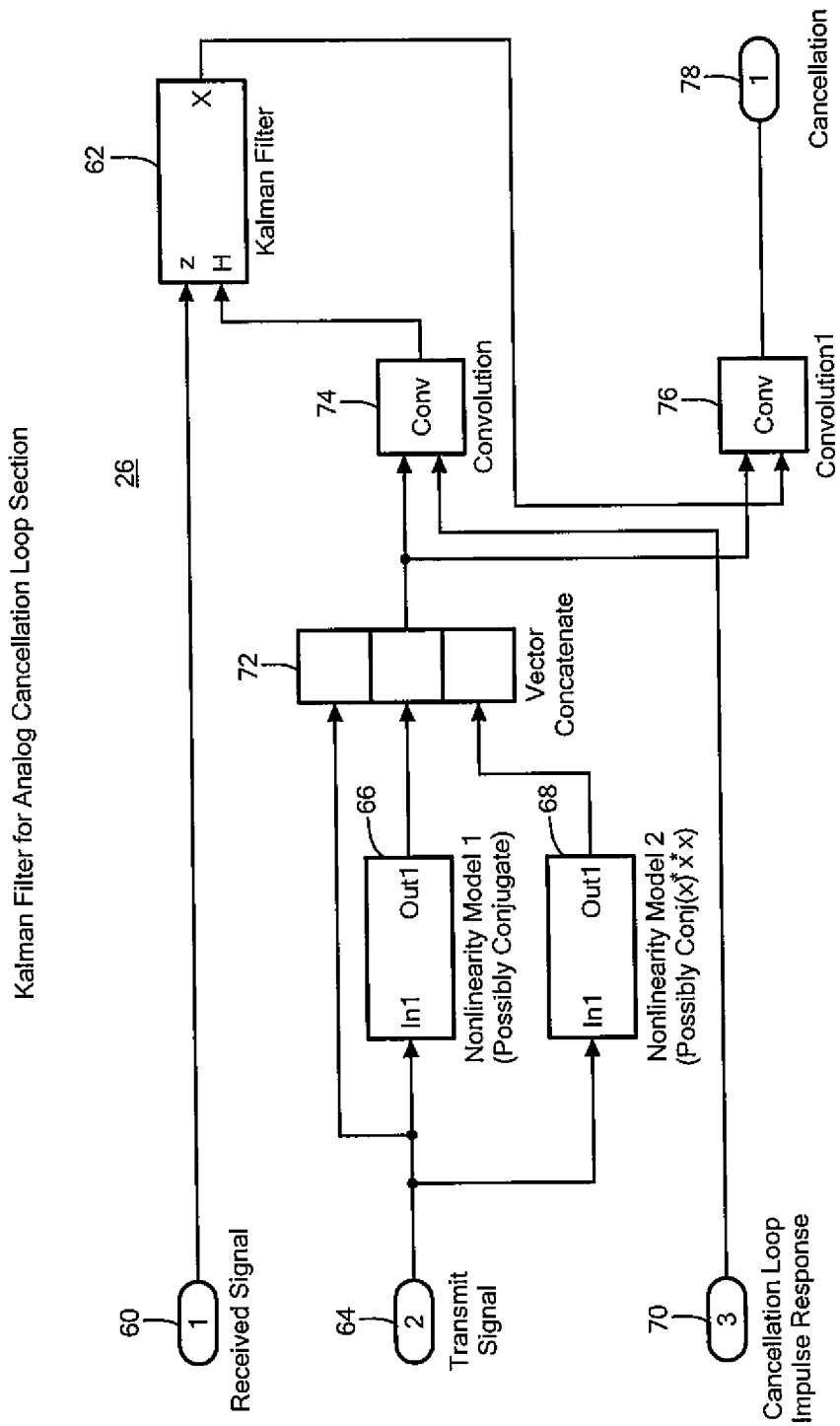
FIG. 4 is a schematic block diagram showing the primary components associated with a Kalman Filter for Analog Cancellation Loop section of FIG. 1.

FIG. 4 shows the contents of FIG. 1 block 26 and FIG. 1 block 32, which are essentially identical operations using different inputs. This figure demonstrates the contents of the Filtered-X Kalman filter. Received signal 60 is presented as observation z as input to a normal Kalman filter 62. The transmit signal 64 is passed as the first input to vector concatenator 72. Signal 62 is passed through a nonlinearity model 66 as the second input to concatenator 72. Signal 62 is passed through a second nonlinearity model 68 as the third input to the concatenator 72. The output of the concatenator is passed to an input of convolver 74. The stored impulse response 70 is the second input to convolver 74. The output of convolver 74 is passed as observation transpose vector H to Kalman filter 62. The output of Kalman filter 62 is the state vector x, which represents the impulse response of the required cancellation filter. This output is convolved with the output of concatenator 72 in block 76 to produce the desired analog cancellation signal 78.

Figure 5:
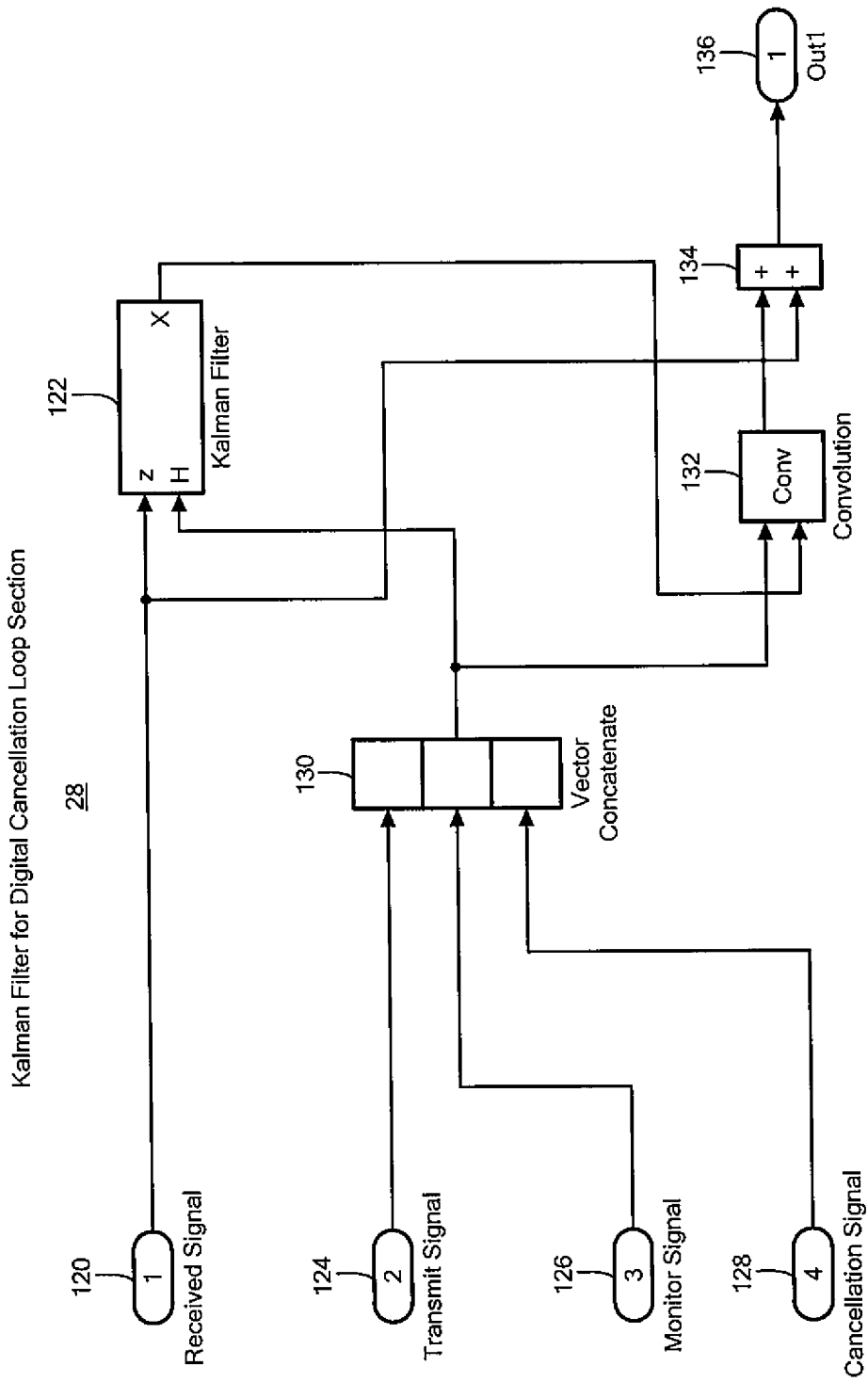
FIG. 5 is a schematic block diagram showing the primary components associated with a common filter for the digital cancellation loop section of FIG. 1.

FIG. 5 shows the contents of block 28, FIG. 1. Received signal 120 is presented to input z observation of Kalman filter 122. Transmit signal 124, monitor signal 126 and cancellation signal 128 are concatenated at block 130. The output of block 130 is presented as the observation vector transpose H input to Kalman filter 122. State output x from Kalman filter 122 represents the impulse response required for cancellation. This output is convolved with the output of concatenator 130 at block 134. The output of convolver 134 is added to received signal 120 at adder 134 to produce final digital output signal 136.

Accordingly, a signal to be transmitted at 10, FIG. 1 is processed before providing it to transducer 16 and a received signal at transducer 18 is processed to provide received signal 34 in accordance with the system.

The Filtered-X and Modified Filtered-X algorithms are employed providing active cancellation or active noise cancellation. In these algorithms, a reference signal (the interferer) is presented. In one example, the reference signal is the local desired transmission. A cancellation path is provided—in one case, this is an additional D/A converter and summing junction into the low noise amplifier. This path generally has a relatively fixed frequency response that may be calibrated before operation. Use of an additional delay in transmission, as well as inclusion of modulator and amplifier distortion modeling is disclosed in PCT/US2016/037243.

That publication discusses adaptive algorithms such as Filtered-X least mean squares. Commonly known algorithms include gradient descent and recursive least squares (RLS). These algorithms are known to have difficulties. The gradient descent method converges very slowly. The RLS method has stability problems when the reference signals are narrow-band. Furthermore, the RLS method has difficulty when the desired received signals are large with respect to the reference, or are correlated with the reference. Furthermore, these algorithms do nothing to take into account the possibility of a changing environment. For our purposes, we are seeking cancellation on the order of 100 dB. Any small changes in the local environment will destroy our cancellation efforts if they are not taken into account. A rotating antenna, local water temperature changes, or motion of the system will create such change. We sought a method that was practical, responds appropriately to environment change, and takes correlation between reference and received signals into account.

A Kalman filter architecture was derived in which the cancellation filter is modeled as a set of coefficients with a random walk of its coefficients. The Filtered-X component preferably includes of the measurement matrix. The plant noise is the amount of random walk expected (how quickly does the gain of the environment change). The measurement noise is the expected received signal.

In the cancellation system, there are a few types of signals of interest. The received signal is the signal we actually have, prior to any kind of cancellation. In active cancellation, we generally cannot process this signal, due to its dynamic range. In digital cancellation, this is what we start with. Reference signals are signals that are used in the canceller to perform cancellation. Generally, the cancellation system creates time-varying filters that are applied to these reference signals, then summed and somehow presented for cancellation. In active cancellation, this result is presented to some kind of electronics to perform cancellation. In digital cancellation, the result is numerically subtracted from the received signal. The cancellation signal is the result of convolving the time-varying cancellation filters with the reference signals, and summing. The calibration signals in active cancellation are desirable to characterize the electronic path for the active cancellation and this is the impulse response for that path.

The output signal in active cancellation, is the result of the electronic cancellation against the received signal. This may be generated by an electronic summing junction, or by using an acoustic or RF active element. In digital cancellation, this is the result of subtracting the cancellation signal from the received signal.

Novel features of the system of FIG. 1 include a random walk Kalman filter for adaptive cancellation in acoustic measurement systems with deliberate transmissions and for RF measurement systems with deliberate transmissions, a Kalman filter designed for skipping chunks of data, a Kalman filter designed for handling contiguous chunks of data, numerical methods for speeding up the Kalman computation, based on using chunks of data, and/or Fourier transform approximations to further speed up the Kalman computation.

Kalman equations may include, for one system:

$$x_k = F_k x_{k-1} + B_k u_k + w_k \quad (1)$$

$$z_k = H_k x_k + v_k \quad (2)$$

$$Q_k = E(w_k w_k^\dagger) \quad (3)$$

$$R_k = E(v_k v_k^\dagger) \quad (4)$$

Kalman projections may include:

$$\hat{x}_{k|k-1} = F_k \hat{x}_{k-1|k-1} + B_k u_k \quad (5)$$

$$P_{k|k-1} = F_k P_{k-1|k-1} F_k^\dagger + Q_{k-1} \quad (6)$$

Kalman corrections may include $$y_k = z_k - H_k \hat{x}_{k|k} \quad (7)$$

$$S_k = H_k P_{k|k-1} H_k^\dagger + R_k \quad (8)$$

$$K_k = P_{k|k-1} H_k^\dagger S_k^{-1} \quad (9)$$

$$\hat{x}_{k|k} = \hat{x}_{k|k-1} + K_k y_k \quad (10)$$

$$P_{k|k} = (I - K_k H_k) P_{k|k-1} \quad (11)$$

For our purposes, x is the state vector, representing the adaptive filter coefficients we are designing to be our cancellation system. The vector is a vertical concatenation of different impulse responses. There will be one impulse response for each compensation signal brought for reference. One will be an impulse response to be applied to the original transmission signal. If distortion terms need to be cancelled, there will be one impulse response for each type of distortion to be cancelled. In a typical RF system, we may say we need an impulse response 30 samples long, and we will have our original signal, the conjugate of the original signal (to represent mixer imbalance) and the signal times the magnitude squared of the signal (to represent $3^{rd}$ order intermodulation distortion). In this case, the x vector would be a vertical concatenation of 3 vector each of length 30—which is a vector of length 90. When the process completes, the cancellation signal will be the sum of the result of filtering each of the reference signals by the appropriate impulse responses. In one example the process separates the x estimate vector back into the three impulse responses, filters the linear term by the first impulse response, filters the conjugate term by the second impulse response, filters the signal times magnitude squared by the third impulse response, and add the outputs of the three filters which is the cancellation output of the Kalman Filters.

F is a matrix that represents how the cancellation filters age with time. Generally, they should hold pretty constant (more on this to follow), so this may just be an identity matrix. B is a matrix that represents how the cancellation filters change systematically with some other input. Initially B will be a zero matrix. u is the input that represents how the cancellation filters change systematically. Initially, u will be zero. w is an unobservable vector that describes random change in the cancellation filters. This represents thermal drift, wave action, motion of the system, etc. This is typically regarded as a zero-mean Gaussian set of random elements. It has the same number of elements as the x vector. Q is the autocovariance matrix for the w vector. This matrix is estimated to typically represent how rapidly the system is going to change. This will be based on thermal models, models of wave action and such. This is a square, Hermitian (matrix equals its conjugate transpose), non-negative-definite (vector-transpose times matrix times same vector is real and greater than or equal to zero). If w is a length 90 vector, then Q is 90 by 90. Sometimes, it can be assumed that Q is some constant variance times the identity matrix. H is the matrix that represents the estimated cancellation path results. H times x is our best estimate of the signal that will cancel our self-transmission. The cancellation path takes the reference signals (the actual signal and its distortion models), filters them by the cancellation filters from x, passes them through the D/A converter, some other electronics, back through the summing junction, other circuitry and finally the A/D converter. The D/A to A/D path is a linear time-invariant filter. We calibrate the system and measure its impulse response hc. So the overall cancellation is to filter the reference signals by the cancellation filter, sum them, then pass them through hc. Mathematically, we can change the order of operations. We could equivalently take the reference signals, filter them by hc, then filter by x. This order operation change is the basis of Filtered-X. The H matrix is generated to perform the equivalent convolutions as follows. First, filter the transmission signal by hc. If the cancellation filter has N elements, and we are going to process M receiver samples, then we will need to filter N+M−1 samples. Samples 1 through N of the filter output become the first row of H. Samples 2 through N−1 of the filter output become the second row of H. Repeat this process until you have built the first M rows of H. Next, filter the first distortion reference signal (conjugate term) by hc, as we did with the transmission signal in the step above. Keep adding to the rows of H. Last, filter the second distortion reference signal (signal times magnitude squared), keep adding to the rows of H. y is the actual, compensated receiver output after analog cancellation. If we process in a block, this is a vector whose length is equal to the number of samples in the block (M as mentioned above). v is the combination of noise plus desired received signal. This has the same dimensions as y, and is not directly observable. R is the covariance of v. It is M by M square, Hermitian, and non-negative definite. For a well-designed system, we will have $R_k = \sigma_{rx}^2 I$, where the variance is equal to the expected receive signal power plus noise power. P is the covariance matrix for our cancellation filter coefficients. We generally start off with some diagonal matrix whose elements represent the estimated range of the possible filter values.

To summarize time-varying inputs are the received signal, used in updating the cancellation filter coefficients, and the transmitted signal and its distortion model terms. Covariance matrices Q and R may be time-varying, if based on temperature, wind, received signal level, and other information, or they may be fixed. Fixed values and/or initial conditions include hc (the calibration impulse response for the cancellation compensation electronics), P (the initial guess at covariance of the cancellation coefficients), x (the initial guess for the cancellation coefficients which may be all zeros (typical), or may be stored based on last use or calibration) and Q and R (the covariance matrices for the random walk of the cancellation coefficients and signal) which may be constant, depending on operational characteristics or alternatively, may be time-varying as noted above).

The outputs are x (the cancellation coefficients are an output, but they are usually not useful on their own, and the summed convolution of the cancellation coefficients x with the transmitted signal and its distortion model terms forms the signal to be sent to the analog cancellation electronics.

The computed values are x-hat (running estimates of the cancellation coefficients), S (an intermediate matrix value), K (the Kalman correction gain), and P (the estimated covariance matrix for x).

Some additional math enables reduction in the amount of computation required as follows $$\hat{x}_{k|k-1} = \hat{x}_{k-1|k-1} \tag{12}$$

$$P_{k|k-1} = P_{k-1|k-1} + \sigma_{walk}^2 I \tag{13}$$

$$y_k = \text{observation}_k \tag{14}$$

The number of columns in the H matrix is equal to the number of feedforward terms. The number of rows in the H matrix is equal to the number of radio receiver samples used in the update. If the filter is updated every sample, we see that H is a row vector, so S is scalar. For multiple samples, we need to do this as a matrix. The S matrix in this case is square, with dimensionality equal to the number of receiver samples used. Generally, we have been using several thousand samples, and so inverting this matrix is onerous. To simplify the computation, we will employ the Woodbury matrix identity:

$$(A+UCV)^{-1} = A^{-1} - A^{-1}U(C^{-1}+VA^{-1}U)^{-1}VA^{-1} \tag{15}$$

We will use the Lemma to simplify the computation of the Kalman gain by inverting $$S_k = H_k P_{k|k-1} H_k^\dagger + \sigma_{rx}^2 I \text{ using the lemma.} \tag{16}$$

$$A = \sigma_{rx}^2 I \quad (17)$$
$$U = H_k$$
$$C = P_{k|k-1}$$
$$V = H_k^\dagger$$

$$S_k^{-1} = \frac{1}{\sigma_{rx}^2}I - \left(\frac{1}{\sigma_{rx}^2}\right)^2 H_k\left(P_{k|k-1}^{-1} + \frac{1}{\sigma_{rx}^2}H_k^\dagger H_k\right)^{-1}H_k^\dagger \quad (18)$$
$$= \frac{1}{\sigma_{rx}^2}\left(I - H_k(\sigma_{rx}^2 P_{k|k-1}^{-1} + H_k^\dagger H_k)^{-1}H_k^\dagger\right)$$

We see that this involves inverting two matrices, each of which is square and has dimensionality equal to the number of feedforward coefficients used, and each guaranteed to be positive definite.

Additionally, we can rewrite the Kalman gain:

$$K_k = P_{k|k-1}H_k^\dagger S_k^{-1} \quad (19)$$
$$= P_{k|k-1}H_k^\dagger \frac{1}{\sigma_{rx}^2}\left(I - H_k(\sigma_{rx}^2 P_{k|k-1}^{-1} + H_k^\dagger H_k)^{-1}H_k^\dagger\right)$$
$$= \frac{1}{\sigma_{rx}^2}P_{k|k-1}\left(I - H_k^\dagger H_k(\sigma_{rx}^2 P_{k|k-1}^{-1} + H_k^\dagger H_k)^{-1}\right)H_k^\dagger$$

Defining:

$$T = H_k^\dagger H_k, \text{ we find: } \quad (20)$$
$$\hat{x}_{k|k} = \hat{x}_{k|k-1} + \frac{1}{\sigma_{rx}^2}P_{k|k-1}\left(I - T(\sigma_{rx}^2 P_{k|k-1}^{-1} + T)^{-1}\right)(H_k^\dagger y_k)$$

and $$P_{k|k} = \left(I - \frac{1}{\sigma_{rx}^2}P_{k|k-1}\left(I - T(\sigma_{rx}^2 P_{k|k-1}^{-1} + T)^{-1}\right)T\right)P_{k|k-1} \quad (21)$$

We can reduce the number of inversions required by:

$$\hat{x}_{k|k} = \hat{x}_{k|k-1} + \frac{1}{\sigma_{rx}^2}\left(P_{k|k-1} - P_{k|k-1}T(P_{k|k-1}^{-1}(\sigma_{rx}^2 I + P_{k|k-1}T))^{-1}\right)(H_k^\dagger y_k) \quad (22)$$
$$= \hat{x}_{k|k-1} + \frac{1}{\sigma_{rx}^2}\left(P_{k|k-1} - P_{k|k-1}T(\sigma_{rx}^2 I + P_{k|k-1}T)^{-1}P_{k|k-1}\right)(H_k^\dagger y_k)$$

$$P_{k|k} = P_{k|k-1} - \frac{1}{\sigma_{rx}^2}\left(P_{k|k-1} - P_{k|k-1}T(\sigma_{rx}^2 I + P_{k|k-1}T)^{-1}P_{k|k-1}\right)TP_{k|k-1} \quad (23)$$

We can reuse some computations, noting that both T and P are symmetric, so defining:

$$Q = P_{k|k-1}T, \text{ then} \quad (24)$$

$$\hat{x}_{k|k} = \hat{x}_{k|k-1} + \frac{1}{\sigma_{rx}^2}\left(P_{k|k-1} - Q(\sigma_{rx}^2 I + Q)^{-1}P_{k|k-1}\right)(H_k^\dagger y_k), \text{ and} \quad (25)$$

$$P_{k|k} = P_{k|k-1} - \frac{1}{\sigma_{rx}^2}\left(P_{k|k-1} - Q(\sigma_{rx}^2 I + Q)^{-1}P_{k|k-1}\right)Q^\dagger \quad (26)$$

In summary, the basic steps are use the previously generated $\hat{x}_{k|k}$ as a finite impulse response filter on our desired transmission to generate the cancellation signal. Then wait long enough that we are sure that only this last cancellation filter is present in our data, and grab a buffer-full $y_k$ generate the $H_k$ matrix by filtering the desired transmission signal, compute $T = H_k^\dagger H_k$, compute $P_{k|k-1} = P_{k-1|k-1} + \sigma_{walk}^2 I$, and compute $Q = P_{k|k-1}T$.

Then, compute "key matrix"

$$V = \frac{1}{\sigma_{rx}^2}\left(P_{k|k-1} - Q(\sigma_{rx}^2 I + Q)^{-1}P_{k|k-1}\right),$$

compute cross-correlation $c = H_k^\dagger y_k$, compute the new cancellation filter $\hat{x}_{k|k} = \hat{x}_{k|k-1} + Vc$, and compute the new covariance matrix $P_{k|k} = P_{k|k-1} - VQ^\dagger$.

In practice, we have noted that the slowest portions of the computation are the fourth through eight steps. We know that T is Hermitian (conjugate-symmetric) and nearly Toeplitz (common diagonals). We know that H is Toeplitz. We can substitute some approximate matrices using the following formulas.

We can say:
c=IFFT (conj(IFFT (h))FFT(y)), where h is the transmission signal filtered by the estimate of the cancellation frequency response, and y is the received signal and T≈Toeplitz (IFFT (|FFT(h)|$^2$)).

In other words, c is approximately a vector consisting of the first few elements of the cross-correlation of the filtered transmission signal with the received signal, and T is approximately a Toeplitz matrix of the autocorrelation of the filtered transmission signal. These approximations do result in some degradation of the cancellation performance—most notably they seem to slow convergence by 30% or so. However, they result in a factor of 2-10 reduction in overall computation. This translates to higher throughput, lower cost and lower complexity.

The above functionality may be implemented in the Kalman filter for analog cancellation loop and Kalman filter for monitor analog cancellation loop blocks of FIG. 1 and FIG. 4. One or more processors may be used and programmed to perform the signal processing described above.

One method of performing cancellation for acoustic or electromagnetic measurement or communications includes receiving an output signal to be applied to a transmit transducer, introducing a delay to the output signal to produce a delayed output signal, applying the delayed output signal to the transmit transducer, receiving an input signal from a receiving transducer, wherein the input signal comprises at least a portion of the delayed output signal, and iteratively solving a Kalman filter problem as a function of the input signal, the output signal, and the delay to produce a first filtered input signal.

The method may further include iteratively solving a Kalman filter problem as a function of the first filtered input signal, the complex conjugate of the output signal, and the delay to produce a second filtered input signal; and summing the first filtered input signal and the second filtered input signal. In some examples, the method further includes iteratively solving a Kalman filter problem as a function of the first filtered input signal, the square or the cube of the output signal, and the delay to produce a third filtered input signal and summing the first filtered input signal and the third filtered input signal. Further, the method may include iteratively solving a Kalman filter problem as a function of the first filtered input signal, the delayed output signal, and the delay to produce a fourth filtered input signal, and applying adaptive cancellation to the first filtered input signal as a function of the fourth filtered input signal. In some examples, iteratively solving a Kalman filter problem as a function of the first filtered input signal and the fourth filtered input signal to produce a fifth filtered input signal.

Another novel method centers on technology for full-duplex acoustic or RF systems with analog cancellation. Such systems are discussed in PCT/US2016/037243.

Distortion models are sometimes used for the power amplifiers used to produce the transmit signal in such systems. For many systems, this method is adequate to the task at hand. In particular, RF and acoustic systems that employ low-noise linear Class A, B, or C amplifiers work well with those methods. Systems that employ either noisy power amplifiers or amplifiers that cannot be well-characterized by polynomial expansion methods will not work well. An example of prime importance is systems that employ digital, or Class D amplifiers. Many of the acoustic systems are intended for use on autonomous underwater vehicles. Because these vehicles are battery-powered, high efficiency components are required in the design of all elements. Class D amplifiers have efficiency well above 90%, while linear amplifiers typically have efficiency of 10% or lower.

Class D amplifiers are not well characterized by polynomial methods and tend to have fairly high distortion levels. An example common of the shelf (COTS) Class D amplifier we used for underwater communication experiments had nearly 10% distortion for some of our spread-spectrum signals. Therefore, we sought a method to cancel the amplifier distortion and noise after analog cancellation has taken place. This cancellation is typically performed after optional down-conversion and digitization of the signal.

The post-analog cancellation cancellation system is specifically designed to cancel power amplifier noise and distortion terms in full-duplex acoustic and RF systems that employ active analog cancellation. It is designed to be robust under those conditions. There are two separate variants of the system.

In some systems, the various stations have specific frequency zones assigned that do not overlap. For instance, a multiple frequency shift keying system may have one channel that transmits on frequencies (relative to center frequency) of −10 KHz, 10 KHz, 30 KHz, and channel that transmits on −20 KHz, 40 KHz and 50 KHz, with a third that transmits on −50 KHz, −40 KHz and 20 KHz. The first system could pass the measured amplifier distortion through a stop-filter that blocks −10 KHz, 10 KHz and 30 KHz, and use the result for cancellation in a simple fashion. Since there is no linear part of the signal that will bass this stop-band filter, then digital cancellation is ideal. The analog cancellation does not preserve full dynamic range, but this may not present a problem for medium range or low-cost systems In a full generic system, such as long-range or CDMA, or overlapped frequency hopping spread spectrum (FHSS), the full cancellation system employing transmitted signal, cancellation signal and distortion signal are applied to a full-dimensioned cancellation. These may, for example, be stacked side-by-side as columns in the H matrix mentioned in "Filtered-X as Kalman Filter."

A further improvement can be realized. Monitoring the output of the power amplifier of the transmitter elements section 14 of FIG. 1 uses much of the monitoring channel dynamic range to sample the desired linear portion of the output. It is desirable to have as much dynamic range as possible dedicated to the noise and distortion, to maximize the potential cancellation. This is facilitated by how most power amplifiers are built. In most amplifiers, there is a feedback loop around the power output with that output brought to a summing junction that generates the feedback.

An analog cancellation system can be employed to remove the desired transmission signal from the monitor signal prior to digitization. This analog cancellation system is essentially identical in architecture to the analog cancellation system employed at the LNA input. This cancellation arrangement has the same effect as sampling the amplifier signal at the error junction, in the event that such sampling is not possible.

The signal generated at "To monitor" contains a linear-filtered version of the amplifier noise and distortion, less the desired input, preserving exactly the signals we desire. This is the preferred method of monitoring distortion, but one can also monitor the direct output, with a subsequent minor loss of cancellation performance.

As shown in FIG. 1, the Kalman Filter for Digital Cancellation Loop section 28 has as inputs the received signal (a digital signal from the receiver elements 22), to have remaining self-transmission signals canceled), transmit signal (the digital original desired signal for transmission), the monitor signal (the digital signal representing the power amplifier distortion and noise (and possibly original signal)), a cancellation signal (the digital signal sent by the Kalman Filter for Analog Cancellation Loop), and the received signal (digital signal for processing for communication or measurement).

The algorithm for operating the Kalman filter is similar to the Kalman filter operated as the Filtered-X analog cancellation. There are a few differences. There is no analog loop present so we do not need a calibrated transfer function for the loop, since digital subtraction is performed, which has a perfect unity transfer function. Instead of the linear signal and some distortion models as references, we may have only the monitor signal as reference (variant 1), or we may have the linear signal, the analog cancellation signal and the monitor signal (variant 2). Finally, the output does not feed an analog section but is directly subtracted from the receiver signal.

As noted above, x is the state vector, representing the adaptive filter coefficients we are designing to be our cancellation system. The vector is a vertical concatenation of different impulse responses. There will be one impulse response for each compensation signal brought for reference. One will be an impulse response to be applied to the monitor signal. If linear and cancellation references are used, there will be one filter response for each of these. When the process completes, the cancellation signal will be the sum of the result of filtering each of the reference signals by the appropriate impulse responses. One exemplary process is to separate the x estimate vector back into the various impulse responses if needed, filter each reference signal by its corresponding impulse response, and add the outputs of these filters, subtract from the received signal, and that is the final output.

The mathematics and variables for this digital cancellation are the same as previously disclosed for the Filtered-X cancellation with the following exceptions.

H is the matrix that represents the reference results. H times x is our best estimate of the signal that will cancel our self-transmission. The multiplication of the H matrix times the x vector do the equivalent convolutions for us. We will assume we have M receiver samples to process, and that each cancellation filter has N parameters.

Take the first reference signal (the monitor signal).
Samples 1 through N of this signal become the first row of H. Samples 2 through N−1 become the second row of H. Repeat this process until you have built the first M rows of H.

If present, repeat with the second reference signal, keep adding to the rows of H.

Continue with any subsequent reference signals.

y is the actual, compensated receiver output after analog cancellation. If we process in a block, this is a vector whose length is equal to the number of samples in the block (M as mentioned above)

The above functionality may be implemented in the Kalman filter for digital cancellation loop blocks of FIGS. 1, and 5. One or more processors may be used and programmed to perform the signal processing described above.

In one method the output (transmit) signal is amplified and noise and distortion are generated. The amplified signal is monitored. The input (received) signal will now include at least a portion of the output signal and the noise and distortion. The method includes cancelling the output signal from the input signal using a cancellation signal. Further, the noise and distortion are digitized and then the input signal is filtered as a function of the output signal, the cancellation signal, and the noise and distortion to eliminate the noise and distortion. Filtering the input signal preferably includes iteratively solving a Kalman filter problem as a function of the output signal, the cancellation signal, and the noise and distortion.

Figure 6:
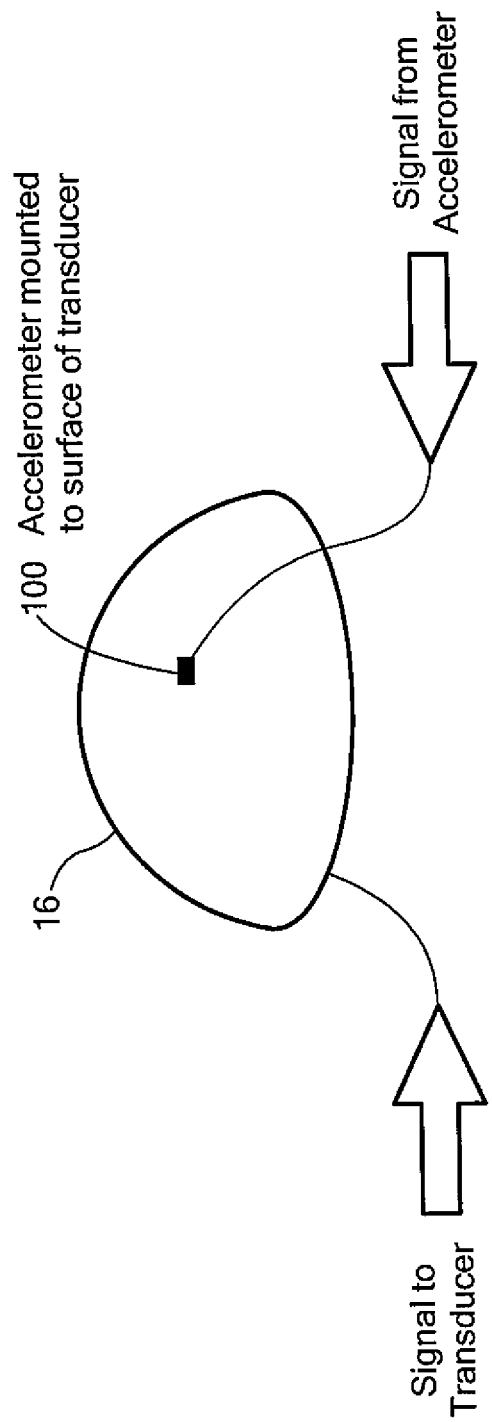
FIG. 6 is a view showing an accelerometer mounted to the surface of the transducer of FIG. 1.

FIG. 6 shows an embodiment where a sensor (e.g., an accelerometer 100) is mounted to the (e.g., hemispherical) surface of the transducer 16 of an acoustic system. For high-power low-frequency acoustics, the ceramic transmitting transducer can introduce nonlinearities. The transducers tend to be big—10's of centimeters to a meter or more in size. The accelerometer is mounted to the surface of the transducer and used as an electronic monitor for nonlinearity/distortion in place of, or in addition to, the electronic monitoring of the power amplifier. The signal output by the accelerometer is processed the same as the "monitor" signal of FIG. 1.

In some cases, for both acoustic full-duplex operation, low noise amplifiers (LNAs) and A/D converters may have sufficient dynamic range to accurately reproduce signals without the need for an analog cancellation stage.

For these cases, cancellation may be performed in a primarily digital fashion. If a linear amplifier, such as class A, B, AB or C is employed, then a Kalman filter of the type previously disclosed can be employed using distortion models.

For a class D amplifier, direct monitoring of the amplifier output may be required. There are two different systems disclosed here. One system is particular to linear amplifiers, and employs a Kalman filter to perform cancellation of linear and modeled distortion products. The other system is particular to class D or PWM amplifiers, and uses direct measurement of amplifier output as a cancellation term to a Kalman filter for cancellation. An accelerometer on the projecting transducer may be substituted for electrical monitoring of the power amplifier, as disclosed in post analog cancellation cancellation.

The cancellation system is specifically designed to cancel power amplifier noise and distortion terms in full-duplex acoustic and RF systems that do not employ active analog cancellation. It is designed to be robust under those conditions. The signal input 20 is digital signal for transmission. In the event that analog cancellation is not necessary and that amplifier monitoring is not necessary, then delay element 12, Kalman filter 26, monitor impulse response 30 and Kalman filter 32 from FIG. 1 may be omitted.

In the event that analog cancellation is not necessary, amplifier monitoring and amplifier cancellation are needed, then Kalman filter 26 may be omitted in FIG. 1.

In the event that analog cancellation is not necessary, amplifier monitoring is necessary but amplifier cancellation is not needed, then Kalman filter 26 and Impulse response 30 may be omitted from FIG. 1, and amplifier cancellation input 98, D/A 100, up-converter 102 and summing junction 104 can be omitted from FIG. 2.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A method of performing cancellation for acoustic or electromagnetic measurement or communications, comprising:
   receiving an output signal to be applied to a transmit transducer;
   introducing a delay to the output signal to produce a delayed output signal;
   applying the delayed output signal to the transmit transducer;
   receiving an input signal from a receiving transducer, wherein the input signal comprises at least a portion of the delayed output signal; and
   Iteratively solving a Kalman filter problem as a function of the input signal, the output signal, and the delay to produce a first filtered input signal.

2. The method of performing cancellation according to claim 1, further comprising:
   iteratively solving a Kalman filter problem as a function of the first filtered input signal, the complex conjugate of the output signal, and the delay to produce a second filtered input signal; and
   summing the first filtered input signal and the second filtered input signal.

3. The method of performing cancellation in accordance with one of claims 1 and 2, further comprising:
   iteratively solving a Kalman filter problem as a function of the first filtered input signal, the square or the cube of the output signal, and the delay to produce a third filtered input signal; and
   summing the first filtered input signal and the third filtered input signal.

4. The method of performing cancellation in accordance with one of claims 1-3, further comprising:
  iteratively solving a Kalman filter problem as a function of the first filtered input signal, the delayed output signal, and the delay to produce a fourth filtered input signal; and
  applying adaptive cancellation to the first filtered input signal as a function of the fourth filtered input signal.

5. The method of performing cancellation in accordance with claim 4, further comprising:
  iteratively solving a Kalman filter problem as a function of the first filtered input signal and the fourth filtered input signal to produce a fifth filtered input signal.

6. The method of performing cancellation of claim 1 further including amplifying the output signal which generates noise and distortion.

7. The method of performing cancellation of claim 6 further including monitoring the amplified signal.

8. The method of performing cancellation of claim 7 wherein the input signal includes at least a portion of the output signal and the noise and distortion.

9. The method of performing cancellation of claim 8 further including cancelling the output signal from the input signal using a cancellation signal.

10. The method of performing cancellation of claim 9 further including digitizing the noise and distortion.

11. The method of performing cancellation of claim 10 further including filtering the input signal as a function of the output signal, the cancellation signal, and the noise and distortion.

12. The method of performing cancellation of claim 11 in which filtering the input signal includes iteratively solving a Kalman filter problem as a function of the output signal, the cancellation signal, and the noise and distortion.

* * * * *